United States Patent

Sweet et al.

[11] 3,740,103
[45] June 19, 1973

[54] ANTI-LOCK BRAKE CONTROL SYSTEM WITH FRONT TO REAR INTERLOCK

[75] Inventors: Douglas W. Sweet; David G. Beyerlein, both of Flint, Mich.

[73] Assignee: General Motors Corporation, Detroit, Mich.

[22] Filed: May 13, 1971

[21] Appl. No.: 142,878

[52] U.S. Cl.......... 303/21 EB, 188/181 C, 303/20, 303/21 AF, 340/52 R
[51] Int. Cl................................................. B60t 8/08
[58] Field of Search............................... 180/105 E; 188/181 C; 303/20, 21; 317/5; 318/52; 324/160–161; 340/52 R, 263

[56] References Cited
UNITED STATES PATENTS

| | | | |
|---|---|---|---|
| 3,398,995 | 8/1968 | Martin | 303/21 BE |
| 3,482,887 | 12/1969 | Sheppard | 303/21 BE |
| 3,584,921 | 6/1971 | Crawford | 303/20 X |
| 3,608,981 | 9/1971 | Yui et al. | 303/21 BE |
| 3,620,577 | 11/1971 | Neisch et al. | 303/21 EB |
| 3,635,530 | 1/1972 | Packer et al. | 303/21 P |

FOREIGN PATENTS OR APPLICATIONS

| | | | |
|---|---|---|---|
| 1,810,163 | 7/1970 | Germany | 303/21 BE |

Primary Examiner—Duane A. Reger
Assistant Examiner—Stephen G. Kunin
Attorney—Jean L. Carpenter, Paul Fitzpatrick and Warren D. Hill

[57] ABSTRACT

A four-wheel anti-lock brake control system has a control circuit and brake pressure modulators for controlling the front and rear brakes of a vehicle in accordance with a function of wheel speeds for preventing wheel lock. A wheel lock circuit responsive to front and rear wheel speeds prevents the condition of anti-lock cycling of the front brakes when the rear brakes are not cycling by disabling the entire control or at least the control to the front wheels. Rear wheel lock is sensed in one embodiment by comparing front and rear wheel speeds and determining when the front speed exceeds the rear by a significant amount for a certain time period, and in another embodiment by determining when the front speed exceeds a given value and the rear speed is below another lower value for a certain time period.

5 Claims, 4 Drawing Figures

INVENTORS
Douglas W. Sweet &
BY David G. Beyerlein
Warren D. Hill
ATTORNEY

ANTI-LOCK BRAKE CONTROL SYSTEM WITH FRONT TO REAR INTERLOCK

This invention relates to an anti-lock brake control system for a vehicle and particularly to an interlock circuit between the front and rear brake controls.

In four-wheel anti-lock brake control system for automotive vehicles it has been proposed to use more or less separate controls for the front and rear brakes. It has been found desirable to assure that if the rear brake wheels lock and remain so for an extended period, that the front brake should be prevented from an anti-lock cycling mode.

It is therefore a general object of this invention to provide a circuit preventing front anti-lock brake control when the rear brakes are not being similarly controlled.

It is another object of the invention to provide in an anti-lock brake control system a circuit for sensing front and rear speeds to determine when anti-lock brake control cycling is occurring only at the front wheels and to disable at least the front control.

It is a further object of the invention to provide a circuit in an anti-lock brake control system to compare front and rear wheel speeds for sensing when the front wheel speeds are significantly higher than the rear wheel speeds for a predetermined time and to disable at least the front wheel brake control.

It is yet another object of the invention to provide a circuit in an anti-lock brake control system to determine when the front wheel speeds exceed a minimum value and the rear speeds remain below another value for a predetermined time period and to disable at least the front brake control.

The invention is carried out by providing an anti-lock brake control system for both front and rear wheels of a vehicle including a circuit responsive to front and rear wheel speed signals to provide an output signal according to speed differences, a circuit comparing the speed difference output to a standard to determine when the front wheel speed exceeds the rear wheel speed by a determinable amount and a circuit for disabling the front brake control or both brake controls when the excess speed differential exists for a certain time period.

The invention is also carried out by providing in an anti-lock brake control system for both front and rear wheels of a vehicle, a circuit responsive to the front wheel speed to determine when it exceeds a preset value, a circuit responsive to rear wheel speed to determine when it remains below a second lower value and a circuit for disabling at least the front brake control when the first two circuits are satisfied for a certain time value.

The above and other advantages will be made more apparent from the following specification taken in conjunction with the accompanying drawings wherein like reference numerals refer to like parts and wherein.

In general, the subject anti-lock brake control system is patterned after that described in the U.S. Pat. application of Van Ostrom et al., Ser. No. 806,807 filed Mar. 13, 1969 now abandoned wherein a control circuit senses braked wheel speed and detects incipient wheel lock-up and then calls for a release of brake pressure to allow wheel speed recovery and upon recovery, effecting brake reapplication and repeating the release-apply cycle as often as required. The brake pressure modulation is achieved by a pressure modulator like that described in the U.S. Pat. No. to Harned et al. 3,524,685 or the aforementioned Ser. No. 806,807. The modulators are operated by a solenoid operated control valve and are so arranged that brake release occurs upon energization of the solenoid and the brakes are applied when the solenoid is not energized.

In particular, the subject anti-lock control system comprises a pair of two-wheel anti-lock brake control circuits interlocked for cooperative action. The system when utilizes two brake pressure modulators, one for the front wheels and one for the rear. While the subject invention is in principle applicable to either conventional rear drive vehicles or front drive vehicles, it is desired herein in terms of a rear drive vehicle and as such, utilizes a single rear wheel sensor driven according to the average rear wheel speeds and an individual sensor for each non-driven front wheel.

Figure 1:
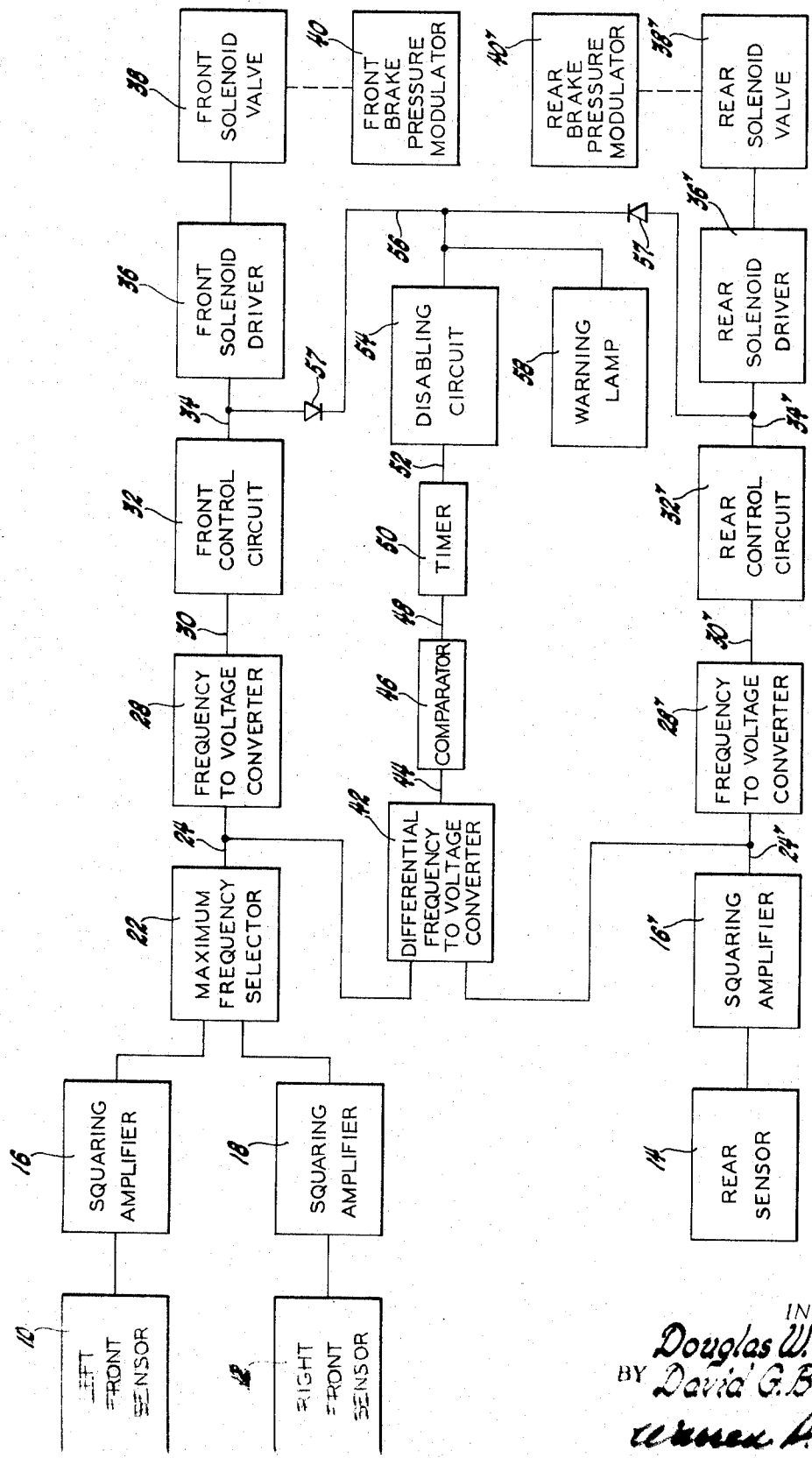
FIG. 1 is a block diagram of a four-wheel anti-lock brake control system including an interlock circuit according to one embodiment of the invention.

Referring to FIG. 1, there is shown a left front wheel speed sensor 10, a right front wheel speed sensor 12, and a rear wheel speed sensor 14. The sensors are preferably of the well-known toothed wheel variable reluctance electromagnetic transducer type. The front sensors 10 and 12 are driven directly by the respective wheels while the rear sensor detects the speed of the propeller shaft or some other drive member proportional to average rear wheel speed. The sensor 10 is connected directly to a squaring amplifier 16 and the sensor 12 is connected to a squaring amplifier 18. The squaring amplifiers 16 and 18 are connected to a digital maximum frequency selector 22 which produces an output signal on line 24 comprising a square wave signal having a frequency proportional to the fastest front wheel. Such a maximum frequency selector may be a circuit like that of U.S. Pat. No. 3,539,920 provided with gates to channel the highest frequency input signal to the output. The line 24 is connected to a frequency-to-voltage converter 28 which produces a DC output on line 30 which varies according to maximum front wheel speed. That output is connected to a front control circuit 32 which senses incipient front wheel lock-up to produce on line 34 a control signal which effects brake release by means of a front solenoid driver circuit 36 which is connected directly to the front solenoid valve 38. The valve in turn controls the front brake pressure modulator 40. The rear sensor 14 is connected through a squaring amplifier 16' which is connected by line 24' to a frequency-to-voltage converter 28'. The remaining portions of the rear control system correspond to the front system and are indicated by primed numerals.

The interlock circuit to prevent anti-lock cycling of the front brakes only, includes a differential frequency-to-voltage converter 42 deriving inputs from lines 24 and 24' and produces an analog DC output which varies according to the difference between front and rear wheel speeds. The output on line 44 is connected to a comparator circuit 46 which produces an output signal on line 48 whenever the signal on line 44 crosses a preset reference threshold thereby indicating that the front wheel speed exceeds the rear wheel speed by a significant amount. The amount of speed difference required to produce an output on line 48 is preferably a variable increasing as wheel speeds increase. The comparator signal on line 48 activates a timer 50 which times out if the signal 48 persists for a predetermined period which is on the order of 0.7 seconds. This time delay is significant because in normal anti-lock brake cycling operation, the front and rear brakes are not necessarily applied and released in synchronism and indeed, usually will alternate. Under these conditions, the rear speed will often legitimately become much lower than the front speed, but only for very brief periods somewhat less than 0.7 seconds. It is only when the speed difference persists for the full period of the time delay that there is an indication of improper control operation and this is likely to be a result of rear wheel lockup. The timer output on line 52 actuates a disabling circuit 54 which, via line 56 and diodes 57, grounds the lines 34 and 34' thereby disabling both front and rear brake controls so that conventional braking is applied to all brakes thereby preventing an anti-lock cycling of the front brakes. Optionally, the line 56 is applied only to the line 34 in the front control to disable the front only so that if the rear wheels recover from the locked condition, the rear anti-lock control will remain operative. The disabling circuit also energizes a warning lamp 58 to indicate to the vehicle operator that the control has been disabled.

Figure 2:
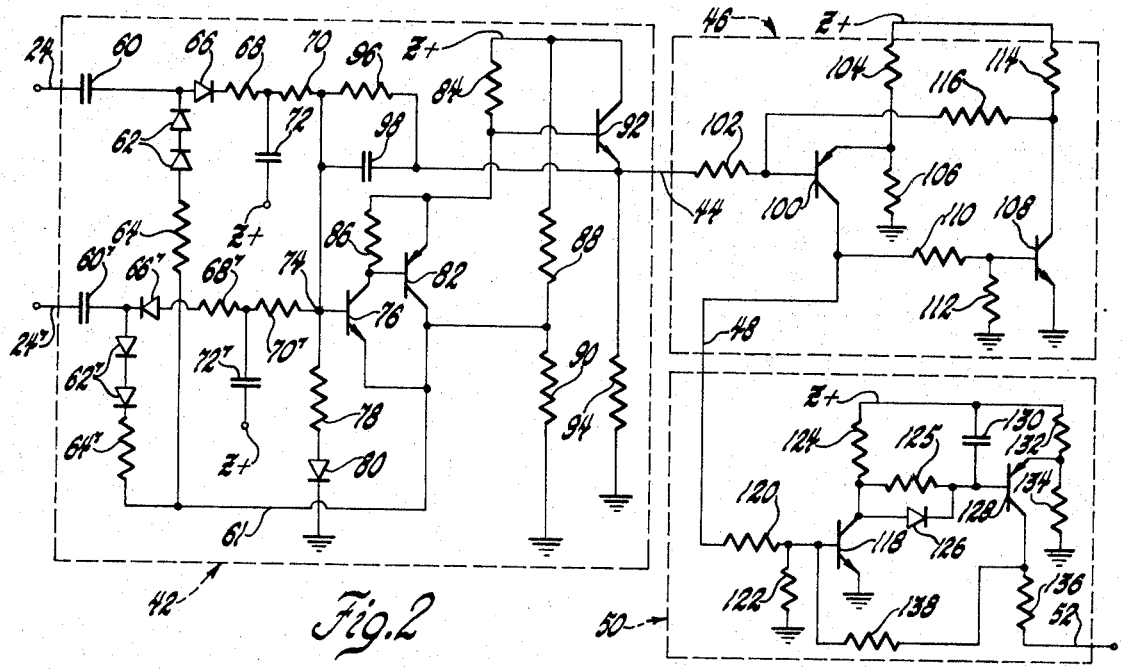
FIGS. 2 and 3 are schematic diagrams illustrating the interlock circuit according to the first embodiment; and, FIG. 4 is a schematic diagram illustrating the second embodiment of an interlock circuit according to the invention.

FIG. 2 illustrates in schematic form the differential frequency-to-voltage converter 42, the comparator 46, and the timer 50. The circuits are provided with a regulated voltage on line Z+ from a power supply, not shown. The differential frequency-to-voltage converter 42 receives square wave inputs from lines 24 and 24' and generates an analog output on line 44 as a function of the difference of input frequencies. The line 24 is connected to one side of a pulse forming capacitor 60, the other side of which is connected to a common line 61 through a pair of diodes 62 in series with a resistor 64. The other side of the capacitor 60 is also connected through a diode 66 to a filter comprising resistors 68 and 70 in series with their junction point connected through a capacitor 72 to Z+. The resistor 70 in turn is connected to a junction point 74. The line 24' is connected through a similar circuit including components 60'-72'. The latter circuit differs from the former only in that the diodes 62' and 66' are of opposite polarity to the diodes 62 and 66.

A three-stage operational amplifier includes a transistor 76 having its base connected to the junction point 74 and to ground through a bias resistor 78 and a temperature compensating diode 80 in series. The emitter is connected to the common line 61 and the collector is connected to the base of a transistor 82 which has its collector connected to the common line 61 and its emitter connected through load resistor 84 to the line Z+. The emitter is also connected through a leakage bypass resistor 86 to the base. The line 61 is connected to the junction point of voltage dividing resistors 88 and 90 which extend from Z+ to ground. The emitter of transistor 82 is connected to the base of a transistor 92 which has its collector connected to Z+ and its emitter connected to the output line 44 and through load resistor 94 to ground. The emitter of transistor 92 is also connected through feedback resistor 96 to a junction point 74. A small capacitor 98 in parallel with feedback resistor 96 provides filtering. Preferably, the circuit components and particularly the bias resistor 78 are selected so that in its quiescent state the amplifier output on line 44 will be about 4 volts. The Z+ voltage is established at 8.2 volts.

In operation, the positive square wave pulses from line 24 alternately charge and discharge the capacitor 60 so that upon charging, a current pulse is passed by the diode 66 and the adjacent filter to the junction point 74. The discharge current to the capacitor is provided through the diodes 62. Similarly, the square wave signal on line 24' is formed into current pulses by the capacitor 60'. The charging current is carried by the diode 62' and a discharge current is carried by diode 66' so that current is drawn from the junction point 74. When the two input frequencies are equal, the net current flow to the junction point 74 from the diodes 66 and 66' is zero. The feedback current through the resistor 96 then equals the bias current through the resistor 78 and the quiescent state of the amplifier is not disturbed. When, however, the frequency on line 24 is larger than that on line 24', the current flow to the junction point 74 tends to increase so that the output voltage of the amplifier on line 44 will decrease in proportion to the current flow to the amplifier input. Conversely, when the rear wheel speed is greater than the front wheel speed and the frequency of line 24' is therefore higher than that on line 24, then current will be withdrawn from the amplifier input and the voltage on line 44 will proportionately increase. Due to the action of the filters including capacitors 72 and 72', the circuit is not linear. Rather, at high speeds, the circuit is less sensitive than at low speeds.

The comparator circuit 46 comprises a transistor 100 having its base connected through a resistor 102 to the line 44 and its emitter connected to the junction point of voltage dividing resistors 104 and 106 which extend between Z+ and ground. The collector is connected to the output line 48 as well as to the base of a transistor 108 through a resistor 110. The base of transistor 108 is connected to ground through a leakage resistor 112, its emitter is grounded and its collector is connected through a load resistor 114 to Z+ and through a feedback resistor 116 to the base of transistor 100.

In operation, the transistor 100 is normally nonconductive and output line 48 is at ground potential. The comparator is designed to switch to provide a positive output voltage when the line 44 voltage drops to some predetermined value below four volts which represents a significant front speed excess over rear wheel speed. To that end, the resistors 104 and 106 are selected to provide the desired switch point. When the transistor 100 conducts, the transistor 108 will also conduct permitting the feedback resistor 116 to draw current from the base of transistor 100 effecting rapid switching and providing circuit hysteresis. The hysteresis will suppress the effects of any ripple carried by the line 44. Of course, when the voltage on line 44 increases above the original switch point by an amount determined by the hysteresis circuit, then the transistors 100 and 108 will turn off and the line 48 will be returned to ground potential. In practice, the switch point has been selected to occur at a voltage level representing a speed error of 6 mph at low vehicle speeds (15 mph). However, since the converter circuit 42 is non-linear, the switch point (in terms of speed error) changes with vehicle speed so that at a vehicle speed of 30 mph, the comparator switches at 7 mph speed error, at a speed of 60 mph it switches at 9 ½ mph speed error, and at a vehicle speed of 90 mph, the comparator switches at 15 mph speed error.

The timing circuit 50 comprises a transistor 118 having its base connected through a resistor 120 to the comparator output line 48. The base is also connected to ground through leakage resistor 122. The emitter is grounded and the collector is connected through a load resistor 124 to Z+. The collector is also connected through a resistor 125 and a diode 126 in parallel to the base of a transistor 128. That transistor base is also connected through a timing capacitor 130 to Z+. The emitter of transistor 128 is connected to the junction point of voltage dividing resistors 132 and 134 extending between Z+ and ground while the collector is connected through a resistor 136 to the output line 52. The collector of transistor 128 is also connected through a feedback resistor 138 to the base of the transistor 118. In operation, when the input line 48 is at ground potential, the transistors 118 and 128 are non-conducting and both sides of the capacitor 130 are at Z+ potential. When a positive voltage appears on the line 48, the transistor 118 conducts allowing the capacitor 130 to discharge through the resistor 125 and the transistor 118 thereby slowly decreases the voltage on the base of transistor 128. When the latter voltage becomes sufficiently low, the transistor 128 will conduct to produce an output signal on line 52 and also produces a current feedback through resistor 138 to the base of the transistor 118 to latch on that transistor so that the current will continue on line 52 even if the input voltage on line 48 is removed. If, however, prior to the time that the transistor 128 conducts the input voltage 48 drops to ground potential, the transistor 118 will turn off and the capacitor 130 will rapidly recharge through the resistor 124 and the diode 126. The capacitor 130 and resistor 125 are selected so that the time delay is 0.7 seconds.

Figure 3:
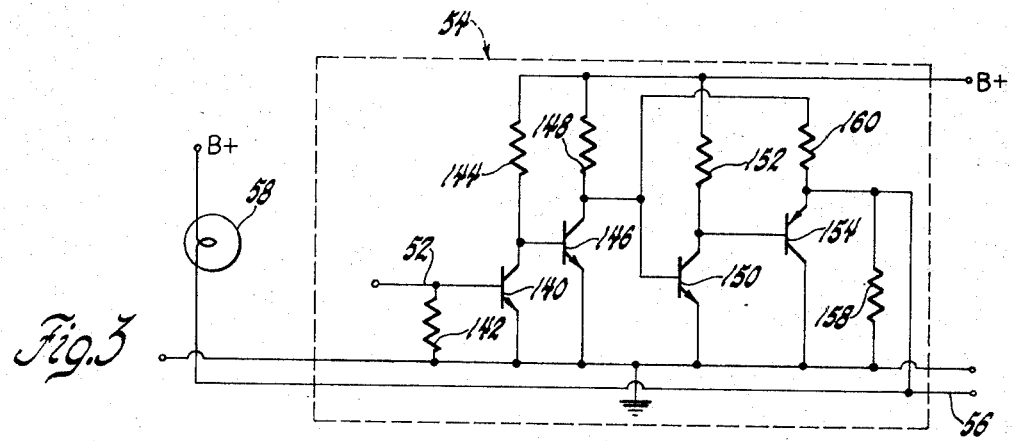

FIG. 3 schematically illustrates the disabling circuit 54 as well as the warning lamp 58. The disabling circuit 54 includes a transistor 140 having its base connected to line 52 from the timer 50 and to ground through a leakage resistor 142. The emitter is grounded and the collector is connected to B+ (vehicle battery voltage) through a load resistor 144 and to the base of a transistor 146. The emitter of the latter is grounded and the collector is connected to B+ through a load resistor 148 and is also connected to the base of a transistor 150 which has a grounded emitter and a collector connected to B+ through a load resistor 152. The collector is also connected to the base of a transistor 154 having a grounded collector and its emitter connected to output line 56 which extends to the warning lamp 58 as well as the lines 34 and 34'. The other side of the warning lamp 58 is connected to the vehicle power supply B+ which is separate from the B+ line supplying power to the circuit 54. A bleed resistor 158 is connected from the emitter of transistor 154 to ground. The emitter of transistor 154 is connected through a feedback resistor 160 to the base of the transistor 150. In the event of a loss of B+ to the disable circuit 54, the other B+ line at the warning lamp 58 will supply a current through the lamp and through the resistor 160 to turn on the transistors 150 and 154 to illuminate the lamp and disable the anti-lock brake control.

The line 52 is normally at ground potential so that the transistor 140 is non-conducting, transistor 146 is conducting and the transistors 150 and 154 are non-conducting so that the emitter of the transistor 150 is at a high potential and the diodes 57 are reverse biased so that the potential on lines 34 and 34' are not affected by the disabling circuit. The warning lamp 58 is not illuminated. However, sufficient lamp current is drawn through the bleed resistor 158 to keep the lamp filament warm thereby reducing the current surge when the lamp does become illuminated. When a current is impressed on line 52, all the transistors will change state so that the transistor 150 conducts to hold the line 56 near ground potential so that the solenoid drivers 36 and 36' can have no energizing inputs. Since the transistor 154 is conducting the lamp 58 becomes illuminated thereby indicating to the vehicle operator that the controls have been disabled.

The operation of the entire circuit is that the differential converter 42 produces an output voltage on line 44 which is a non-linear function of the difference between the front and rear speeds. The comparator 46 will produce an output on line 48 when the voltage on line 44 reaches the switch point indicating a substantial wheel speed difference. The timer 50 then immediately starts timing. If, however, the speed difference is resolved before the timer times out, then the timer 50 will be quickly reset. If, however, the substantial speed difference persists for 0.7 seconds, the timer will produce an output on line 52 and will maintain that output even though the wheel speed difference is later resolved. The disabling circuit in response to the output on line 52 immediately grounds the signals on the lines 34 and 34' to disable the front and rear circuits so that conventional braking is available to all wheels. Optionally, the line 56 may be connected to the front control only to disable the anti-lock control for the front wheels while permitting the rear control to function if it recovers.

Figure 4:
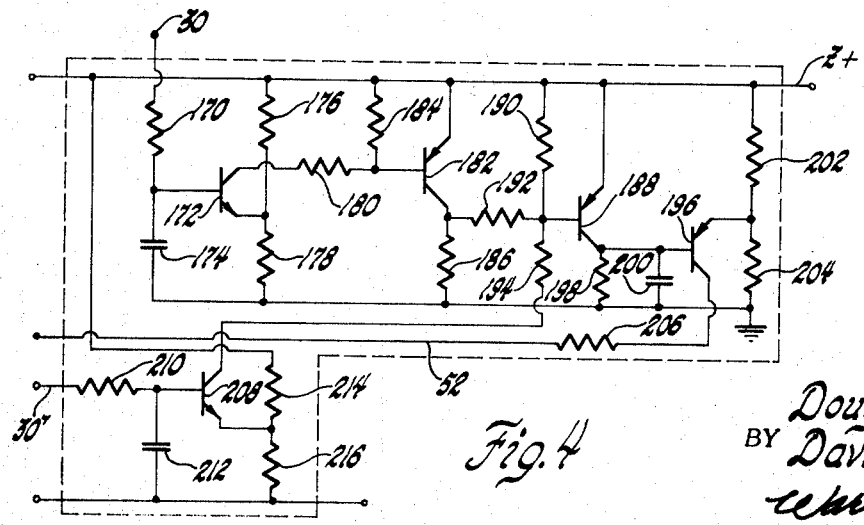

A second embodiment of the invention is illustrated in FIG. 4. According to that embodiment, the analog speed voltage signals of the control circuits of FIG. 1 are sensed and a disable signal is predicated upon the front wheel speeds exceeding a first preset value while the rear wheel speed remains below a second lower preset value. The circuitry of FIG. 4 is to be substituted for the differential converter 42, the comparator 46 and the timer 50 of FIG. 1. The input lines are the lines 30 and 30' of FIG. 1 which carry DC analog voltages representing front and rear wheel speeds. The line 30 is connected through a resistor 170 to the base of transistor 172 and to ground through a filter capacitor 174. The emitter is connected to the junction point of voltage dividing resistors 176 and 178 which extend between Z+ and ground. The collector is connected through a resistor 180 to the base of a transistor 182. The base of transistor 182 is also connected to Z+ through a leakage resistor 184. Its emitter is connected directly to Z+ while its collector is connected to ground through a load resistor 186 and is connected to the base of a transistor 188 through a resistor 192. The base of the transistor 188 is also connected through a leakage resistor 190 to Z+ and to resistor 194. Its emitter is connected directly to Z+ and its collector is connected to the base of a transistor 196. The transistor 188 with the input resistors 190, 192 and 194 comprise a NAND gate. The base of the transistor 196 is connected to ground through a resistor 198 and a timing capacitor 200 in parallel. The emitter of transistor 196 is connected to the junction point of voltage dividing resistors 202 and 204 extending between Z+ and ground while the collector is connected through a resistor 206 to the line 52 which leads to the disabling circuit 54. A rear speed detector includes a transistor 208 having its base connected through a resistor 210 to the line 30'. The base is also connected through filtering capacitor 212 to ground. The emitter is connected to the junction of voltage dividing resistors 214 and 216 which extends from Z+ to ground while the collector is connected to the resistor 194 in the AND gate.

In operation, the circuit is so designed that when the front wheel speed signal on line 30 corresponds to a speed of, say, 16 mph or higher, the transistor 172 will conduct allowing the transistor 182 to conduct applying a high voltage to the AND gate via the resistor 192. When the rear wheel speed as reflected by the signal on line 30' is above say, 11 mph, the transistor 208 will be conducting to impress a low voltage on the AND gate via resistor 194 so that the voltage at the base of the transistor 188 is somewhat below Z+ and that transistor will conduct to maintain the transistor 196 off and line 52 will be at ground potential. Similarly, if the front wheel speed is below 16 mph, the transistor 172 and 182 will be non-conducting and the transistor 188 will be conducting because its base voltage will be somewhat below Z+. If, however, the rear wheel speed is below 11 mph and the front wheel speed is about 16 mph, then all inputs to the AND gate will be high so that the transistor 188 will turn off. Then the timing capacitor 200 will gradually discharge through the resistor 198 and if the input speed conditions are not changed within 0.7 seconds, then the base voltage of the transistor 196 will become sufficiently low for that transistor to conduct to impress a current on line 52 and activate the disabling circuit 54 to disable the brake control. In the event that during the timing period the front wheel speed decreases below 16 mph or the rear speed increases above 11 mph, the transistor 188 will conduct to rapidly recharge the capacitor 200 and prevent the conduction of transistor 196. Of course, the latching circuit equivalent to that disclosed in the embodiment of FIG. 2 (timer 50) may be added for sustaining the output signal on line 52.

In both embodiments described herein, it is not required that the rear speed go to zero to indicate a complete wheel lock. However, experience has shown that when the desired speed differences persist for the period of the timing circuit, the rear wheel will have reached a lock condition or possibly some other rear control circuit malfunction has occurred. In either case, it is desirable to disable at least the front control circuit to assure that the front brakes will not be subject to anti-lock cycling when the rear brakes do not cycle.

The embodiment of the invention described herein is for purposes of illustration and the scope of the invention is intended to be limited only by the following claims:

It is claimed:

1. In a four wheel anti-lock brake control system for a vehicle having a pair of braked front wheels and a pair of braked rear wheels, means for sensing front and rear wheel speeds and a control circuit responsive to a function of said wheel speeds to detect incipient wheel lock-up of each pair of wheels and in response thereto cyclically releasing and applying the front and rear brakes, the control circuit including means for preventing the anti-lock cycling of the front brakes when the front wheel speed greatly exceeds the rear wheel speed for a determined time period comprising means responsive to the front and rear wheel speeds for producing a signal when the front speed is above the rear speed by a determinable amount, and timing means responsive to the signal for disabling at least the anti-lock brake control to the front brakes when the signal is present for a determined time period, whereby anti-lock cycling of the front brakes is prevented when the front wheel speed greatly exceeds the rear wheel speed for a determined time period.

2. In a four-wheel anti-lock brake control system for a vehicle having a pair of braked front wheels and a pair of braked rear wheels, means for sensing front and rear wheel speeds and a control circuit responsive to a function of said wheel speeds to detect incipient wheel lock-up of each pair of wheels and in response thereto cyclically releasing and applying the front and rear brakes, the control circuit including means for preventing the anti-lock cycling of the front brakes when the front wheel speed greatly exceeds the rear wheel speed for a preset time period comprising means for comparing the front and rear wheel speeds for producing a speed difference signal according to the excess of front speed over rear speed, comparator means for comparing the speed difference signal to a reference value and for producing an output when the speed difference signal exceeds the reference value, timing means activated by the comparator output for producing a disable signal when the comparator output is present for a preset period, and means responsive to the disable signal for disabling at least the anti-lock brake control of the front brakes, whereby anti-lock cycling of the front brakes is prevented when the wheel speed difference is present for the preset period.

3. In a four wheel anti-lock brake control system for a vehicle having a pair of braked front wheels and a pair of braked rear wheels, means for sensing front and rear wheel speeds and for producing corresponding digital speed signals, and a control circuit responsive to a function of said wheel speeds to detect incipient wheel lock-up of each pair of wheels and in response thereto cyclically releasing and applying the front and rear brakes, the control circuit including means for preventing the anti-lock cycling of the front brakes when the front wheel speed greatly exceeds the rear wheel speed for a preset time period comprising a differential frequency-to-voltage converter responsive to the digital speed signals for producing a DC signal having a voltage corresponding to the excess of front speed over rear speed, a comparator circuit for comparing the output DC signal to a reference signal and for producing an output when the DC signal attains a certain relationship to the reference signal, so that the output signifies that the excess of front speed over rear speed surpasses a determinable value, a timing circuit activated by the comparator output for producing a disable signal when the comparator output is present for a preset period, and means responsive to the disable signal for disabling the anti-lock brake control system, whereby anti-lock cycling of the front brakes is prevented when the front wheel speed greatly exceeds the rear wheel speed for the preset period.

4. In a four-wheel anti-lock brake control system for a vehicle having a pair of braked front wheels and a pair of braked rear wheels, means for sensing front and rear wheel speeds and for producing corresponding digital speed signals, and a control circuit responsive to a function of said wheel speeds to detect incipient wheel lock-up of each pair of wheels and in response thereto cyclically releasing and applying the front and rear brakes, the control circuit including means for preventing the anti-lock cycling of the front brakes when the front wheel speed greatly exceeds the rear wheel speed for a determined time period comprising a differential frequency-to-voltage converter responsive to the digital speed signals for producing a DC signal having a voltage corresponding to the excess of front speed over rear speeds, a comparator circuit for comparing the DC signal to a reference signal and for producing an output when the DC signal attains a certain relationship to the reference signal, so that the output signifies that the excess of front speed over rear speed surpasses a determinable value, the comparator circuit including a hysteresis circuit for rendering the comparator insensitive to a ripple which may be present in the DC signal, a timing circuit activated by the comparator output for producing a disable signal when the comparator output is present for a preset period, the timing circuit including a latching circuit for maintaining the disable signal, and means responsive to the disable signal for disabling the anti-lock brake control system, whereby anti-lock cycling of the front brakes is prevented when front wheel speed greatly exceeds the rear wheel speed for the preset period.

5. In a four-wheel anti-lock brake control system for a vehicle having a pair of braked front wheels and a pair of braked rear wheels, means for sensing front and rear wheel speeds and a control circuit responsive to a function of said wheel speeds to detect incipient wheel lock-up of each pair of wheels and in response thereto cyclically releasing and applying the front and rear brakes, the control circuit including means for preventing the anti-lock cycling of the front brakes when the front wheel speed greatly exceeds the rear wheel speed for a determined time period comprising means for determining when a front wheel speed exceeds a predetermined value and producing a first signal indicating that vehicle speed is above a minimum speed, means for determining when the rear wheel speed is below a lower predetermined value and producing a second signal indicating low rear wheel speed, and timing means responsive to the signals for disabling at least the anti-lock brake control to the front brakes when both signals are present for a determined time period, whereby anti-lock cycling of the front brakes is prevented when the front wheel speed greatly exceeds the rear wheel speed for a determined time period.

* * * * *

PO-1050
(5/69)

UNITED STATES PATENT OFFICE
CERTIFICATE OF CORRECTION

Patent No. 3,740,103                    Dated June 19, 1973

Inventor(s) Douglas W. Sweet; David G. Beyerlein

It is certified that error appears in the above-identified patent and that said Letters Patent are hereby corrected as shown below:

Column 2, line 20, delete "when" insert --then--,
          line 24, delete "sired" insert --scribed--,
Column 7, line 27, delete "transistor" insert --transistors--,
          line 31, delete "about" insert --above--.

Signed and sealed this 27th day of November 1973.

(SEAL)
Attest:

EDWARD M. FLETCHER, JR.          RENE D. TEGTMEYER
Attesting Officer                Acting Commissioner of Patents